(12) United States Patent
Plaumann et al.

(10) Patent No.: US 8,131,284 B2
(45) Date of Patent: *Mar. 6, 2012

(54) METHOD AND SYSTEM FOR TRANSMISSION AND/OR RECEPTION CALIBRATION OF MOBILE-TELEPHONE DEVICES

(75) Inventors: Ralf Plaumann, Forstern (DE); Dieter Tiroch, München (DE)

(73) Assignee: Rohde & Schwarz GmbH & Co. KG, München (DE)

( * ) Notice: Subject to any disclaimer, the term of this patent is extended or adjusted under 35 U.S.C. 154(b) by 1210 days.

This patent is subject to a terminal disclaimer.

(21) Appl. No.: 11/664,247

(22) PCT Filed: Sep. 27, 2005

(86) PCT No.: PCT/EP2005/010433
§ 371 (c)(1),
(2), (4) Date: Sep. 12, 2007

(87) PCT Pub. No.: WO2006/034843
PCT Pub. Date: Apr. 6, 2006

(65) Prior Publication Data
US 2009/0209249 A1    Aug. 20, 2009

(30) Foreign Application Priority Data

| Sep. 29, 2004 | (DE) | 10 2004 047 309 |
| Nov. 16, 2004 | (DE) | 10 2004 055 232 |
| Jan. 17, 2005 | (DE) | 10 2005 002 206 |
| Feb. 1, 2005 | (DE) | 10 2005 004 631 |

(51) Int. Cl.
*H04W 24/00* (2009.01)
(52) U.S. Cl. ......... 455/423; 455/67.4; 455/69; 455/422; 455/91; 455/424; 455/502; 455/500

(58) Field of Classification Search ............... 455/67.4, 455/69, 423, 422, 91, 424, 500, 502
See application file for complete search history.

(56) References Cited

U.S. PATENT DOCUMENTS

| 6,118,811 A | 9/2000 | Narumi et al. |
| 6,832,075 B1 * | 12/2004 | Henry, Jr. ............... 455/67.14 |

(Continued)

FOREIGN PATENT DOCUMENTS

EP    0420 505 A2    4/1991

(Continued)

OTHER PUBLICATIONS

International Search Report for PCT/EP2005/010433, mailed Jan. 27, 2006.

(Continued)

*Primary Examiner* — Kwasi Karikari
(74) *Attorney, Agent, or Firm* — Marshall, Gerstein & Borun LLP

(57) ABSTRACT

The invention relates to a method and system for calibrating the transmission and/or reception of at least one mobile radio device wherein a respectively defined number of test signal reference level values in predetermined for the mobile device(s) for a specific number of frequencies of a test signal. The mobile radio device(s) track(s) the real generated and measured level values of the test signal to the respectively associated reference values of all tracings of the real received level values to the associated reception reference values are directly sequential by virtue of full specification of all frequencies and reference level values associated with each frequency to the mobile radio device(s) prior to the beginning of all measurements.

17 Claims, 11 Drawing Sheets

U.S. PATENT DOCUMENTS

| | | |
|---|---|---|
| 2002/0072334 A1 | 6/2002 | Dunne et al. |
| 2004/0127161 A1 | 7/2004 | Leizerovich et al. |
| 2004/0207422 A1* | 10/2004 | Lehtinen et al. .............. 324/758 |
| 2006/0068773 A1* | 3/2006 | Stambaugh et al. .......... 455/423 |

FOREIGN PATENT DOCUMENTS

| | | |
|---|---|---|
| EP | 1 583 265 A1 | 10/2005 |
| WO | WO 2004/015895 A1 | 2/2004 |

OTHER PUBLICATIONS

International Preliminary Examination Report for PCT/EP2005/010433, completed Jan. 2, 2007 (original German and English translation thereof).

* cited by examiner

METHOD AND SYSTEM FOR TRANSMISSION AND/OR RECEPTION CALIBRATION OF MOBILE-TELEPHONE DEVICES

BACKGROUND OF THE INVENTION

1. Field of Invention

The invention relates to a method and a system for transmission and/or reception calibration of mobile-telephone devices.

2. Related Technology

One extremely important manufacturing stage in the production of mobile-telephone devices is the calibration of the parameters of the mobile-telephone device. In this context, a short processing time is desirable in addition to a high level of precision for the calibration. The processing time has a particularly negative effect in the case of parameters, with which the mobile-telephone device must be matched with regard to a plurality of parameter values. This occurs, for example, with the transmission and reception power of the mobile-telephone device, for which several power-level values must be calibrated along the transmission and reception characteristic of the mobile-telephone device in each of several frequency bands and in each of several transmission channels per frequency band.

With the measuring devices and measuring systems previously available on the market, a test signal with an adjustable time duration and adjustable reference-level value is transmitted from a superordinate procedural-control unit to the mobile-telephone device and/or to the measuring device, with which the mobile-telephone device is tested, in order to calibrate each power-level value of the respective frequency-dependent reception and/or transmission characteristic. The transmission-level value generated by the mobile-telephone device corresponding to its real transmission characteristic or respectively the reception-level value generated by the mobile-telephone device corresponding to its real reception characteristic can then be corrected to the transmission reference-level value or respectively the reception reference-level value of the test signal. In order to calibrate each power level value at each frequency, a transmission time for the transmission of the respective reference-level value of the test signal is therefore disadvantageously added in addition to the actual calibration time. This significantly increases the total time for the calibration of all power level values in all frequencies.

GENERAL DESCRIPTION OF THE INVENTION

The invention therefore provides a method and system for the transmission and reception calibration of a mobile-telephone device, with which the processing time for the calibration and the transmission and reception power of a mobile-telephone device is significantly reduced by comparison with the prior art.

Accordingly, the invention provides a method for transmission and/or reception calibration of at least one mobile-telephone device by specifying for the mobile-telephone device(s) a given number of reference-level values of a test signal respectively for a given number of frequencies of a test signal and by measuring the level values actually generated by the mobile-telephone device dependent upon the reference-level values and actualizing them to the respectively-associated reference-level values of the test signal, wherein all measurements of the actually-generated level values follow one another in direct succession as a result of a complete specification to the mobile-telephone device(s) of all frequencies and of the reference-level values associated with each frequency by a unit for super ordinate procedural control or a measuring device before the start of any measurements.

The invention also provides a system for transmission and reception calibration of at least one mobile-telephone device with a measuring device and at least one mobile-telephone device, which receive(s) respectively for a given number of specified frequencies at least one specified reference-level value of a test signal, which is used for the actualization of a level value actually generated by the mobile-telephone device(s) and measured by the measuring device, wherein all measurements of the actually-generated level values follow one another in direct succession as a result of the reception of all frequencies and all reference-level values associated with each frequency before the start of any measurements.

According to the invention, in a first embodiment of the system according to the invention for transmission and reception calibration of a mobile-telephone device, before the implementation of all of the calibration processes, the transmission and reception reference-level values of the test signal specifically required at each of the frequencies used are transmitted as a whole by a unit for superordinate procedural control to the mobile-telephone device and to the device, with which the mobile-telephone device is tested. By means of a synchronization signal generated by the unit for superordinate procedural control, the calibration, in which initially, all of the level values of the test signal actually transmitted and/or received by the mobile-telephone device are measured, is then started, and following this, the level values of the test signal actually transmitted and/or received by the mobile-telephone device are corrected to the respectively-corresponding transmission and reception reference-level values of the test signal—without the provision of an intermediate transmission procedure for the reference-level values of the test signal.

With a calibration system according to the prior art, an average calibration time of 30 seconds to 80 seconds can be assumed for the calibration of four frequency bands, ten transmission channels per frequency band and five power level values per transmission channel; with the method and system according to the invention for transmission and reception calibration of mobile-telephone devices, the calibration time is reduced to less than one second.

The calibration of the transmission and reception power of the mobile-telephone device, which is generally implemented jointly, is organized according to the invention in such a manner that, on the one hand, the calibration of all transmission-level values is implemented before or after the calibration of all reception-level values or, on the other hand, the calibration of each individual transmission-level value is implemented simultaneously with the calibration of each individual reception-level value.

In the case of a calibration of the reception-level values, a parallel calibration of several mobile-telephone devices is possible according to the invention. The frequency calibration of the frequency oscillator of the mobile-telephone device can be implemented according to the invention in parallel with the calibration of the reception-level values.

Within the framework of a calibration process, the individual transmission and reception-level values are each measured in a timeslot, which has a given duration in time. In this context, the timeslots of the individual level values of the test signal associated with a given operating frequency of the test signal can follow one another within a given timeframe directly in time or can be arranged separated from one another by individual timeslots, in which no measurement is implemented. The measurement process according to the invention is interrupted at the transition between two operating frequencies by inserting a timeslot, in which no calibration takes place.

In a second embodiment of the system according to the invention for transmission and reception calibration of a mobile-telephone device, the unit for superordinate procedural control can be dispensed with, because the measuring device transmits all of the frequencies specified by the user or by the respective mobile-telephone standard as well as the associated frequency-dependent transmission and reception reference-level values to the mobile-telephone device.

The third embodiment of the system according to the invention for transmission and reception calibration of a mobile-telephone device only contains a single connecting line, across which the bi-directional transmission between measuring device and mobile-telephone device is implemented.

BRIEF DESCRIPTION OF THE DRAWINGS

The embodiments of the method according to the invention for transmission and reception calibration of a mobile-telephone device and the system according to the invention for transmission and reception calibration of a mobile-telephone device are explained in greater detail below with reference to the drawings. The drawings are as follows.

DETAILED DESCRIPTION

Figure 1:
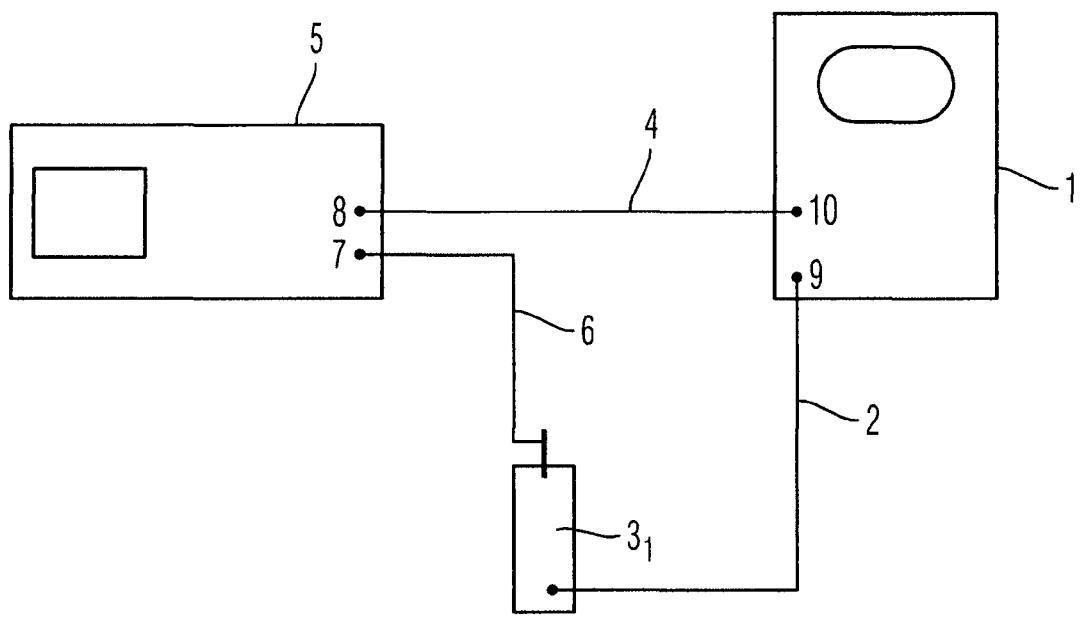
FIG. 1 shows a block circuit diagram of a first embodiment of a system according to the invention for transmission and reception calibration of a single mobile-telephone device.
Figure 2:
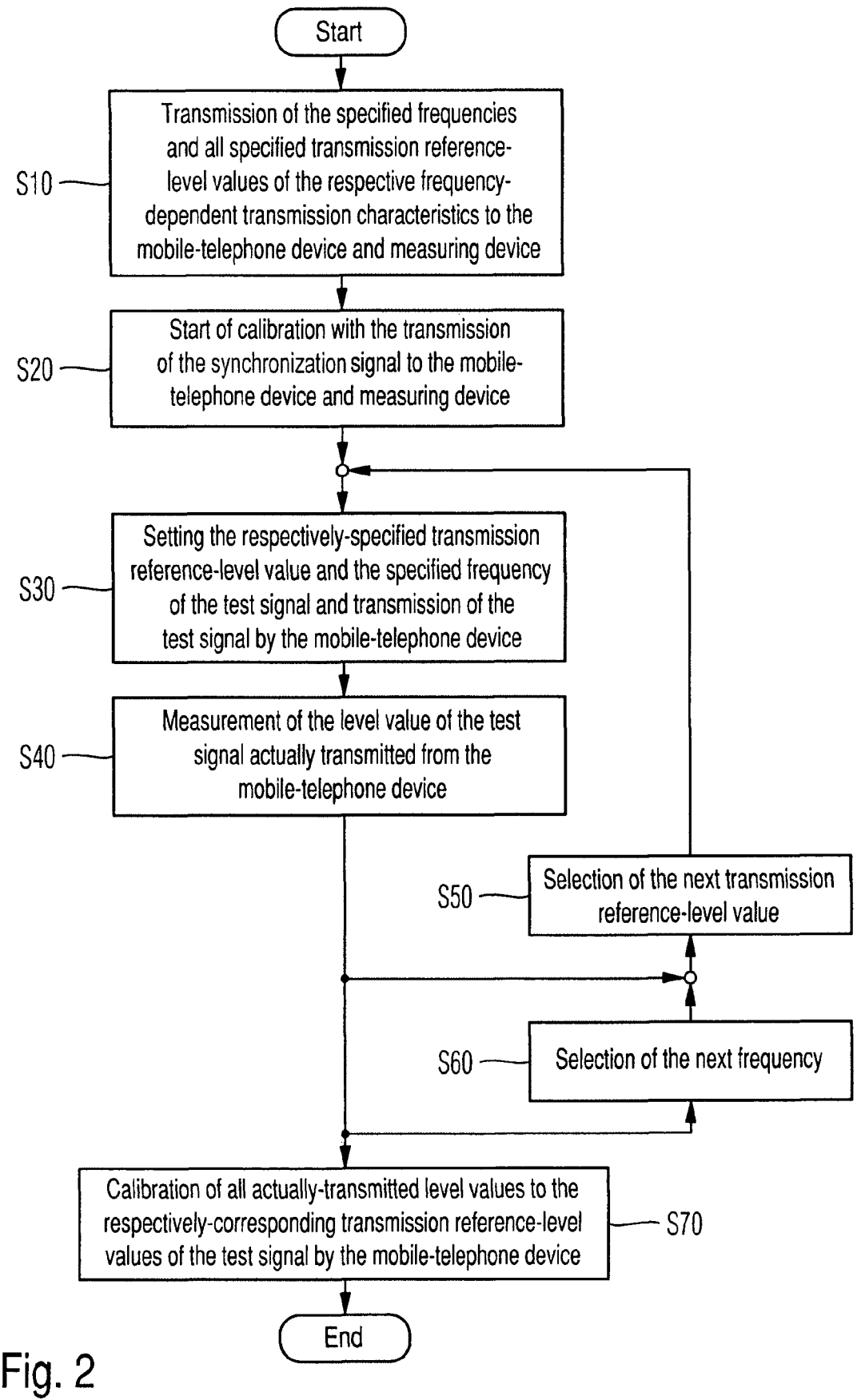
FIG. 2 shows a flow chart of the method according to the invention for transmission calibration of a mobile-telephone device.

Starting from FIG. 1, which shows the block circuit diagram of a first embodiment of the system according to the invention for transmission and reception calibration of a single mobile-telephone device, the following section describes the method according to the invention for transmission calibration of a mobile-telephone device as shown in FIG. 2:

In procedural stage S10 of the method according to the invention for transmission calibration of a mobile-telephone device as shown in FIG. 2, the operating frequencies associated with the specified transmission channels in the individual frequency bands and the transmission reference-level values respectively associated with each operating frequency of the ideal operating-frequency-dependent transmission characteristic of the mobile-telephone device $3_1$ are transmitted via the port 9 and the connecting line 2 to the mobile-telephone device $3_1$ or respectively via the port 10 and the connecting line 4 to the measuring device 5.

In the next procedural stage S20, the calibration is started with the transmission of the synchronization signal from the unit for superordinate procedural control 1 to the mobile-telephone device $3_1$ and to the measuring device 5. In this manner, the mobile-telephone device $3_1$ is self-synchronized according to the invention with the measuring device 5 and with the unit for superordinate procedural control 1. An additional device, for example, an additional trigger or synchronization unit, for continuous synchronization of the measuring device 5 with the mobile-telephone device $3_1$, is not required in this case.

In procedural stage S30, the first operating frequency and the first transmission reference-level value of the test signal associated with the first operating frequency are set. After the setting of the reference value of the test signal—specified operating frequency and specified transmission reference-level value, the level value of the mobile-telephone device $3_1$ actually generated starting from the transmission reference-level value of the test signal via the transmission characteristic of the output amplifier of the mobile-telephone device $3_1$, is transmitted.

In the next procedural stage S40, the level value transmitted within the system according to the invention by the mobile-telephone device $3_1$ via the connecting line 6 to the measuring device 5 is registered by the measuring device 5.

When this measuring procedure in procedural stage S40 has been successfully completed, if a further transmission reference-level value must be measured and calibrated in the respective operating frequency, the further transmission reference-level value of the mobile-telephone device $3_1$ is selected within the framework of procedural stage S50, and the next measuring procedure is continued with procedural stage S30.

The procedural stages S30, S40, S50 and S60 are then repeated iteratively until all actually-transmitted level values of the operating-frequency-dependent transmission characteristics of all transmission channels to be calibrated have been measured. In the final procedural stage S70, all of the transmission-level values actually transmitted by the mobile-telephone device $3_1$ and measured by the measuring device 5 are transmitted via the connecting line 4, the unit for superordinate procedural control 1 and the connecting line 2 to the mobile-telephone device $3_1$. These actually-transmitted level values are corrected by the mobile-telephone device $3_1$, by superposition of a compensation signal, to the respectively-corresponding transmission reference-level values.

Figure 3:
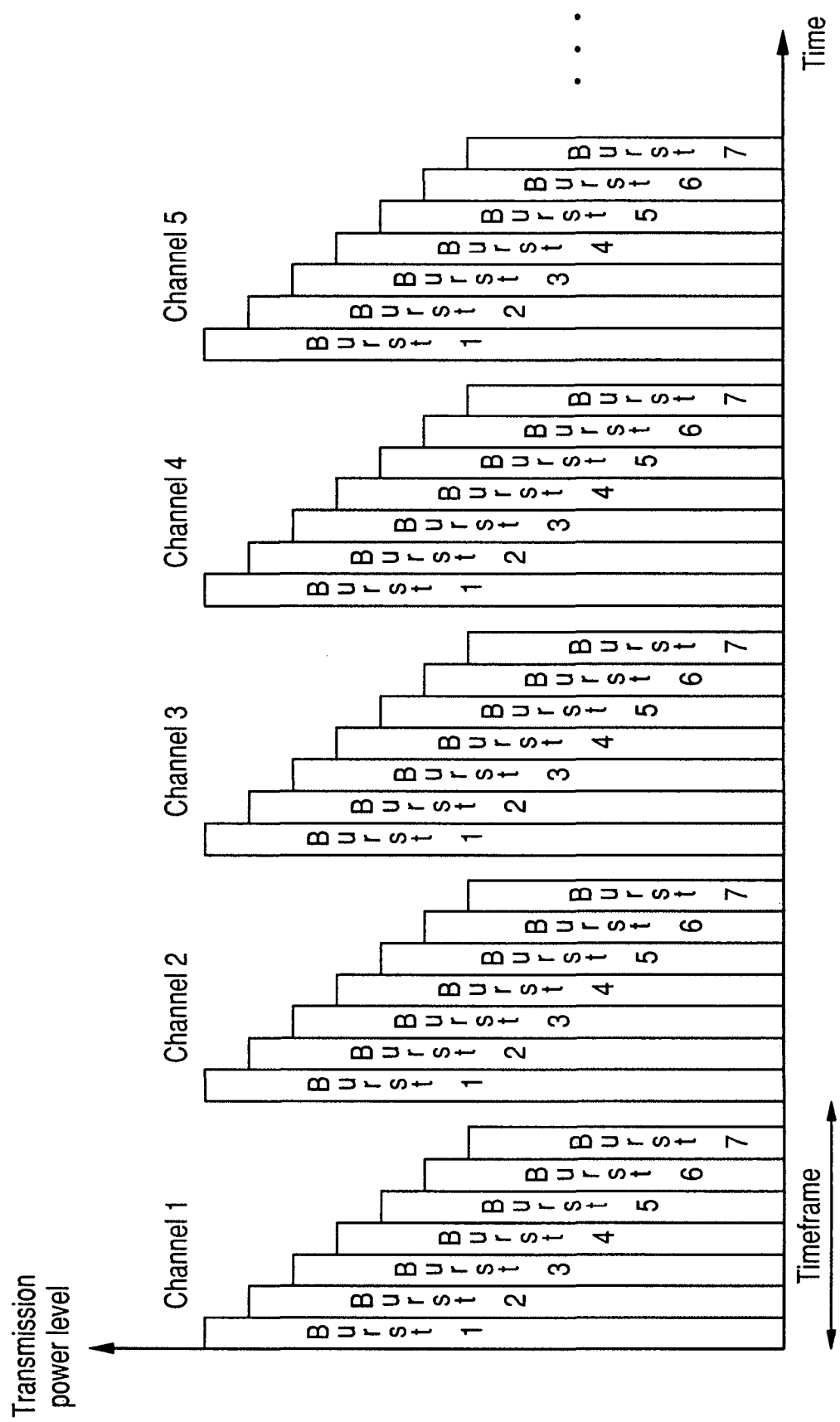
FIG. 3 shows a time-flow diagram of the method according to the invention for transmission calibration of the mobile-telephone device.

FIG. 3 shows the time-flow diagram for the calibration of the transmission characteristic of the mobile-telephone device $3_1$. The diagram shows the transmission reference-level values of the test signal for the individual transmission channels 1, 2, 3, 4, 5 etc representing the operating-frequency-dependent transmission characteristic. A timeslot, in which the measuring procedure of the actually-transmitted level value is implemented, is provided for the calibration of each transmission reference-level value of the test signal.

Figure 4:
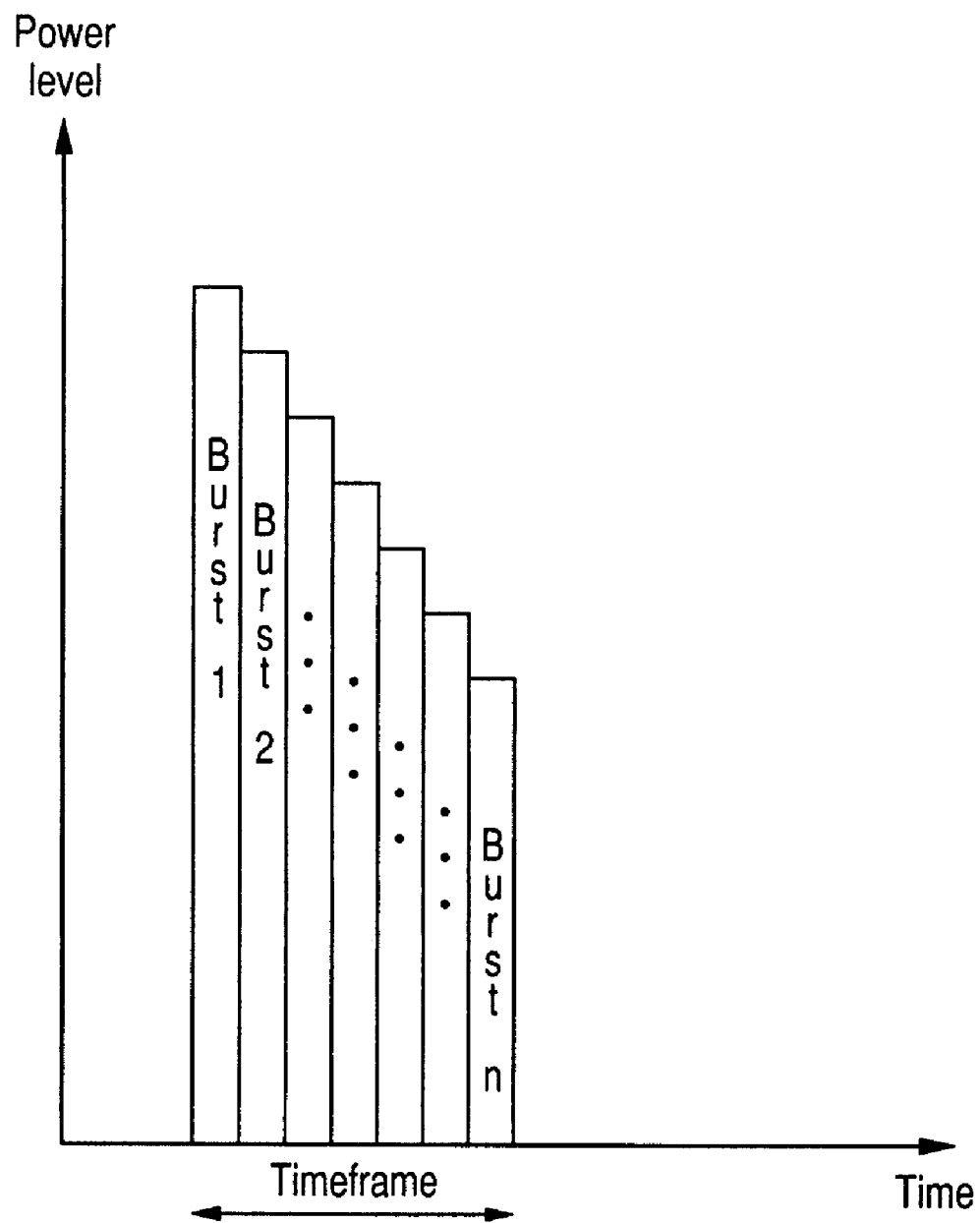
FIG. 4 shows a time-flow diagram for several timeslots following in direct succession within a timeframe.
Figure 5:
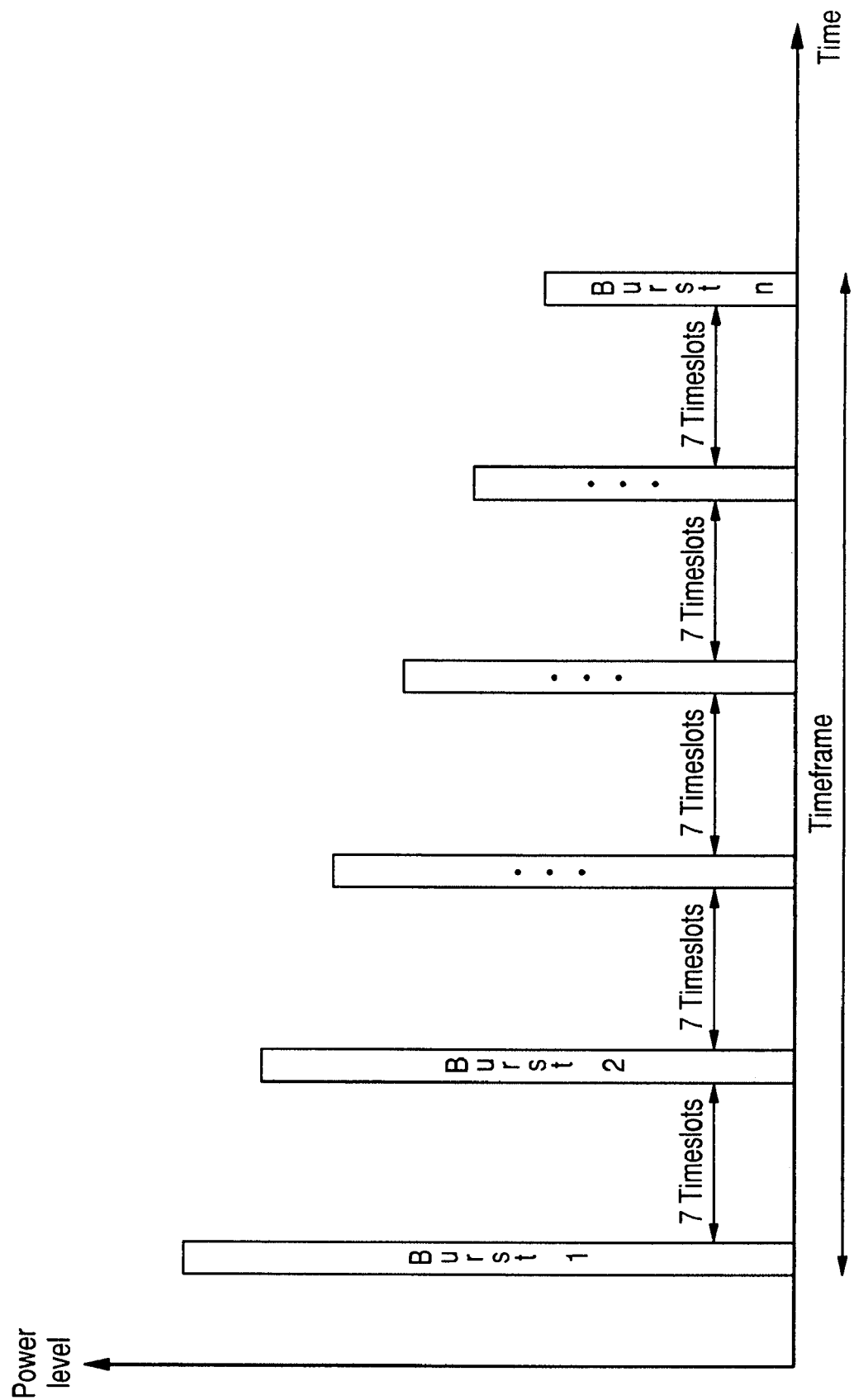
FIG. 5 shows a time-flow diagram of several timeslots spaced out within a timeframe.

The total number of measurements per transmission channel, by way of example, in FIG. 3, a total of seven level measurements, is implemented within a timeframe. In this context, the individual timeslots can be arranged in direct succession one after the other, as illustrated in FIGS. 3 and 4, or separated from one another by a given number of timeslots, in which respectively no measurement is implemented, as shown in FIG. 5. The number of timeslots in FIG. 5, in which, deliberately, no measurements are implemented, is, for example, seven. In the case of the immediately successive timeslots in FIGS. 3 and 4, which follow the timeslot, in which the last of all measurements of the respective transmission channel is implemented, one timeslot is provided, in which the frequency switchover to the next transmission channel is implemented and therefore no measurement takes place.

Figure 6:
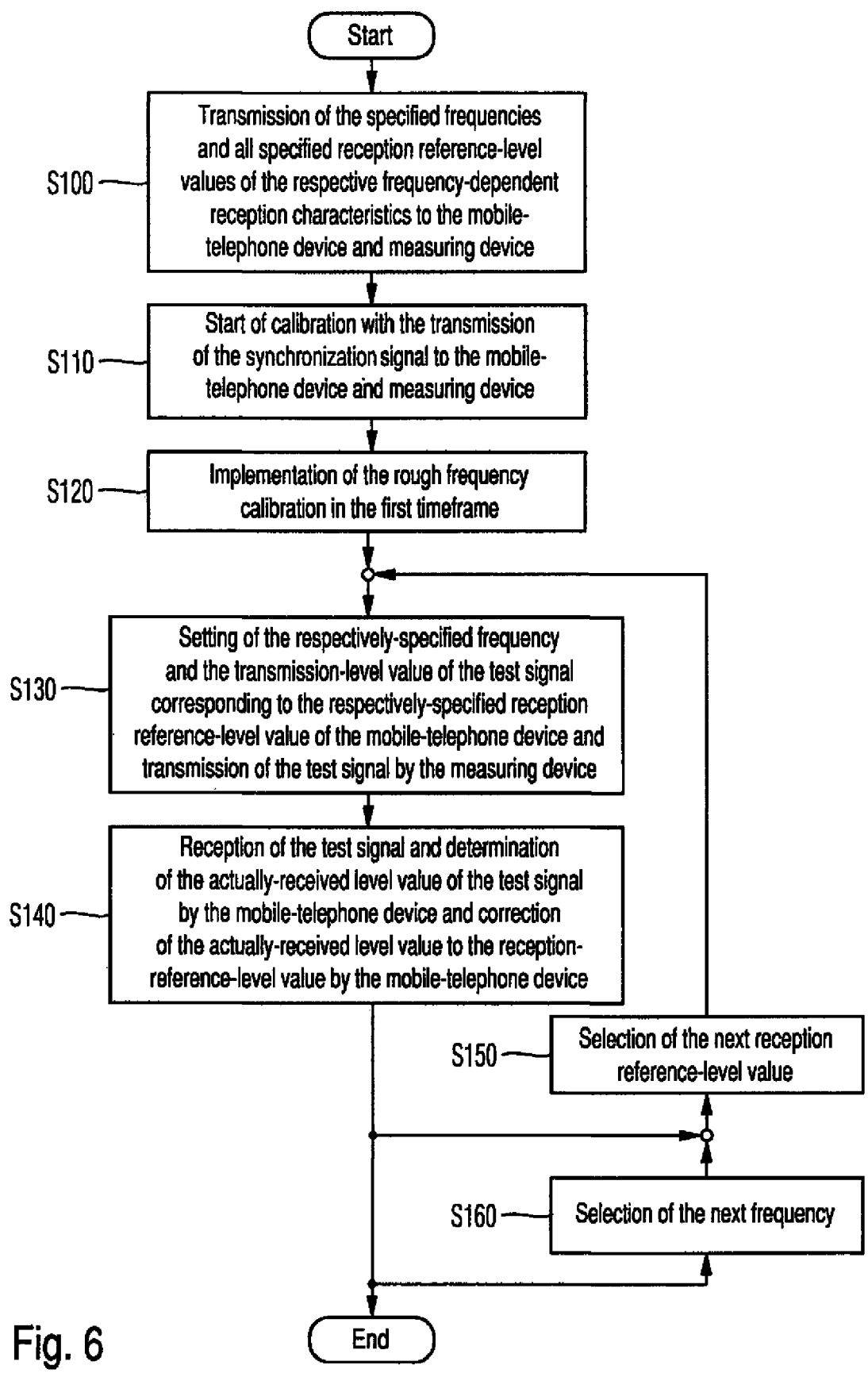
FIG. 6 shows a flow chart of the method according to the invention for reception calibration of a mobile-telephone device.

FIG. 6 presents a flow chart of the method according to the invention for reception calibration of a mobile-telephone device.

In the first procedural stage S100, by analogy with procedural stage S10 of the method according to the invention for transmission calibration of a mobile-telephone device according to FIG. 2, the operating frequencies associated in each case with the previously-specified transmission channels in the individual frequency bands are transmitted by the unit for superordinate procedural control 1, and the reception reference-level values of the operating-frequency-dependent reception characteristic of the input amplifier of the mobile-telephone device $3_1$ associated with the respectively-specified operating frequencies are transmitted via the connecting line 2 to the mobile-telephone device $3_1$ and via the connecting line 4 to the measuring device 5.

In the next procedural stage S110, also by analogy with procedural stage S20 of the method according to the invention for transmission calibration of a mobile-telephone device according to FIG. 2, the start of the calibration is implemented with the transmission of the synchronization signal from the unit for superordinate procedural control 1 to the mobile-telephone device $3_1$ and to the measuring device 5. In this manner, the mobile-telephone device $3_1$ is self-synchronized with the measuring device 5 and with the unit for superordinate procedural control 1.

Figure 7:
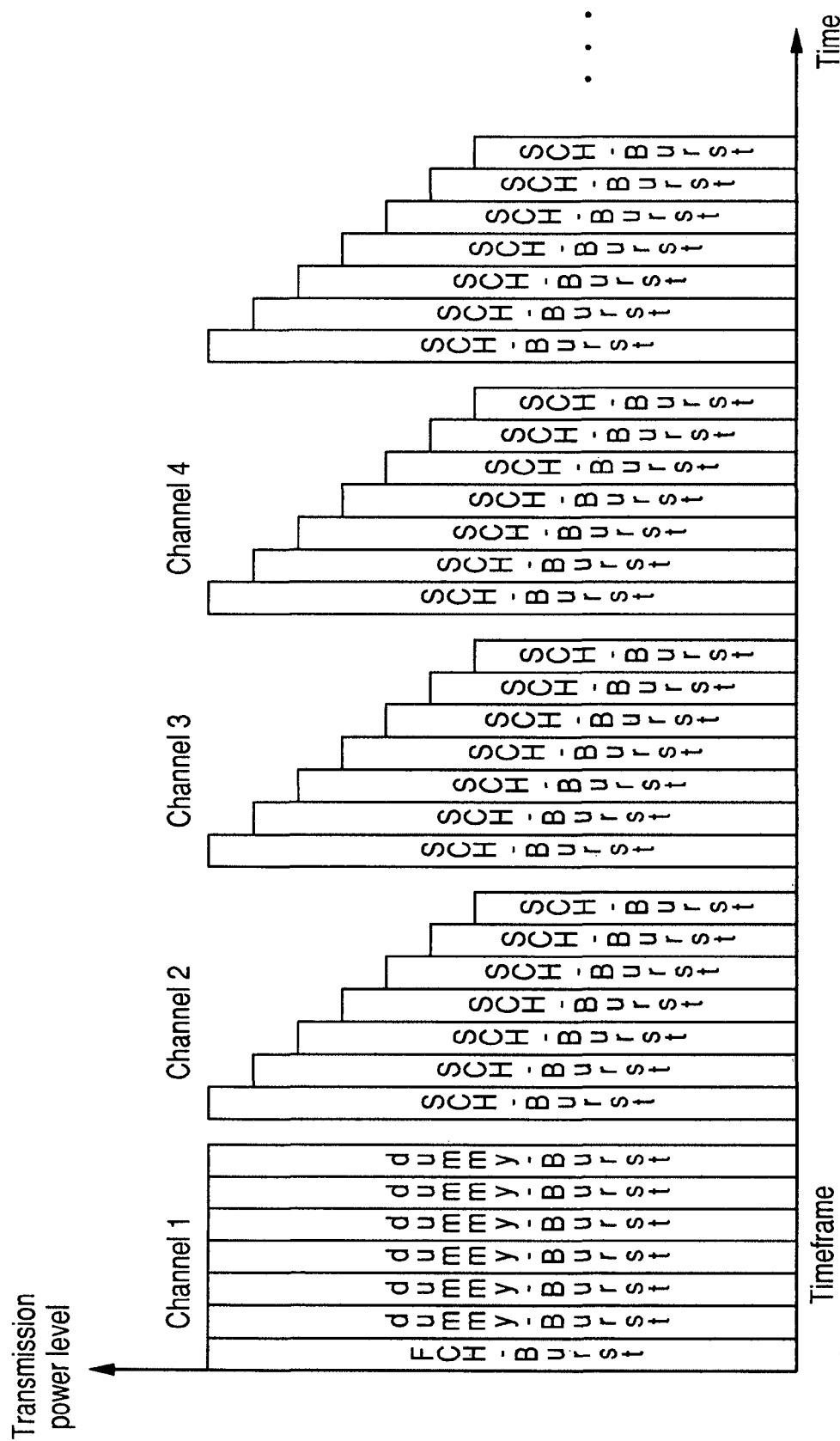
FIG. 7 shows a time-flow diagram of the method according to the invention for reception calibration of a mobile-telephone device.

In the next procedural stage S120, during the first timeframe, a rough frequency calibration of the frequency oscillator of the mobile-telephone device $3_1$ is implemented. The rough frequency calibration according to FIG. 7 is started with a frequency synchronization signal—for example, in the case of the GSM standard, an FCH burst, and extends over several timeslots—in the timeframe shown in FIG. 7, for example, over 6 times slots, in which so-called dummy test signals—test signals without user information or control information—are transmitted from the measuring device 5 to the mobile-telephone device $3_1$. The rough frequency calibration, the detail of which is not the subject matter of the invention, and which is therefore not described in greater detail, is concluded at the end of the first timeframe.

In the next procedural stage S130, the respective previously-specified operating frequency and the respective transmission level of the test signal corresponding to the previously-specified reception reference-level value is set, and accordingly the test signal generated by the measuring device 5 is sent to the mobile-telephone device $3_1$ via the connecting line 6.

In the next procedural stage S140, the test signal transmitted from the measuring device 5 is received by the mobile-telephone device $3_1$, and the actually-received level value of the test signal, which, in the un-calibrated condition, can deviate from the associated reception reference-level value, is determined via the reception characteristic of the input amplifier. In procedural stage S140, the level value of the test signal actually received by the mobile-telephone device $3_1$ is adjusted to the reception reference-level value, for example, via a compensation signal.

After the successful completion of the measurement of the actually-transmitted level value, if another level value of the reception characteristic is to be calibrated within the specified operating frequency of the respective transmission channel, the next reception reference-level value in the respective operating-frequency-dependent reception characteristic of the mobile-telephone device $3_1$ is selected in the next procedural stage S150, and the next measurement is started in procedural stage S120.

When all level values of the reception characteristic at one operating frequency of the respectively-specified transmission channel have been measured, if all of the operating-frequency-dependent reception characteristics of the mobile-telephone device $3_1$ have not yet been measured, the respectively-subsequent operating frequency of the next transmission channel is selected in procedural stage S160, and the next reception reference-level value, which corresponds to the first reception reference-level value of the reception characteristic of the mobile-telephone device $3_1$ associated with the first reception reference-level value of the operating frequency just selected, is selected in procedural stage S150.

Procedural stages S130, S140, S150, and S160 are then repeated iteratively until all actually-received level values have been measured.

Optionally, in procedural stages S130 and S140, a precise frequency calibration of the frequency oscillator of the mobile-telephone device $3_1$ can be implemented in each of the timeslots, for example, in the case of the GSM standard, by means of an SCH burst.

Figure 8:
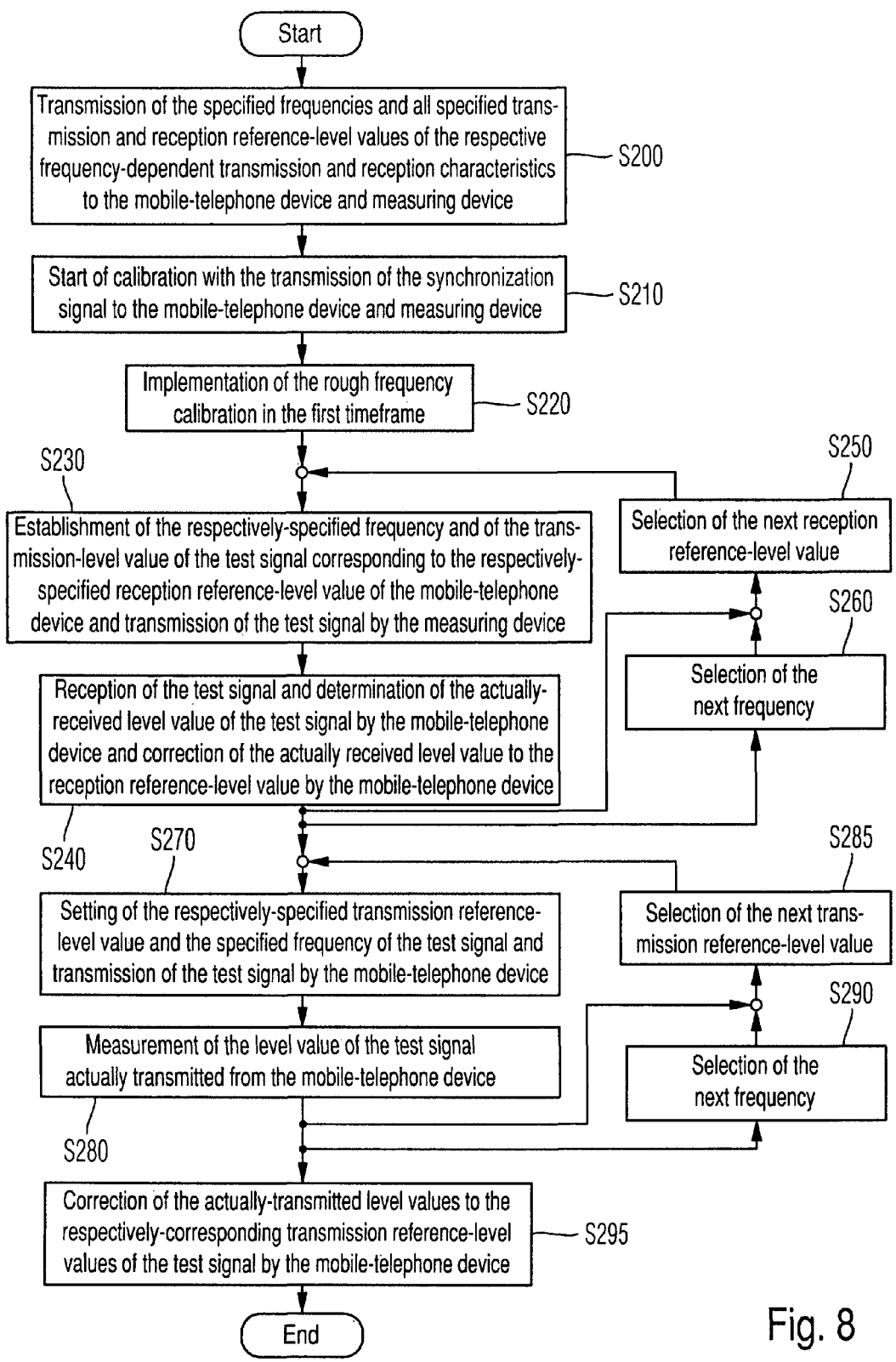
FIG. 8 shows a flow chart of the method according to the invention for sequential transmission and reception calibration of a mobile-telephone device.

FIG. 8 presents the flow chart of the method according to the invention for sequential transmission and reception calibration of a mobile-telephone device.

In procedural stage S200, operating frequencies of all previously-specified transmission channels and the transmission reference-level values and reception reference-level values specified for each respective operating-frequency-dependent transmission and reception characteristic of the mobile-telephone device are transmitted from the unit for superordinate procedural control 1 to the mobile-telephone device $3_1$ via the connecting line 2 and to the measuring device 5 via the connecting line 4.

In the next procedural stage S210, by analogy with procedural stages S20 and respectively S110 in the method according to the invention for transmission and respectively reception calibration of a mobile-telephone device, the start of the calibration is implemented by the transmission of a synchronization signal from the unit for superordinate procedural control 1 to the mobile-telephone device $3_1$ and to the measuring device 5. In this manner, the mobile-telephone device $3_1$ and the measuring device 5 are self-synchronized with one another via the unit for superordinate procedural control 1.

In the next procedural stages S220, S230, S240, S250, and S260, by analogy with procedural stages S120, S130, S140, S150, and S160 of the method according to the invention for reception calibration of a mobile-telephone device, the rough or respectively precise frequency calibration of the frequency oscillator of the mobile-telephone device $3_1$ and the calibration of all reception-level values, which are specified respectively for each operating-frequency-dependent reception characteristic of the mobile-telephone device $3_1$, are implemented.

In the following procedural stages S270, 5280, S285, S290, and S295 by analogy with procedural stages S30, S40, S50, S60, and S70 of the method according to the invention for transmission calibration of a mobile-telephone device, the calibration of all transmission-level values, which are specified respectively for the operating-frequency-dependent transmission characteristic of the mobile-telephone device $3_1$, is implemented.

According to the invention, the calibration of all transmission-level values can also be implemented in procedural stages S270, 5280, S285, S290, and S295 before the rough or respectively precise frequency calibration of the frequency oscillator and the calibration of all reception-level values in procedural stages 5220, 5230, S240, S250, and S260.

Procedural stages S230, S240, S250, and S260 for the calibration of the reception characteristic of the mobile-telephone device $3_1$ and procedural stages S270, S280, S285, and 5290 for the calibration of the transmission characteristic of the mobile-telephone device $3_1$ are then repeated iteratively until all actually-received and actually-transmitted level values have been measured.

Figure 9:
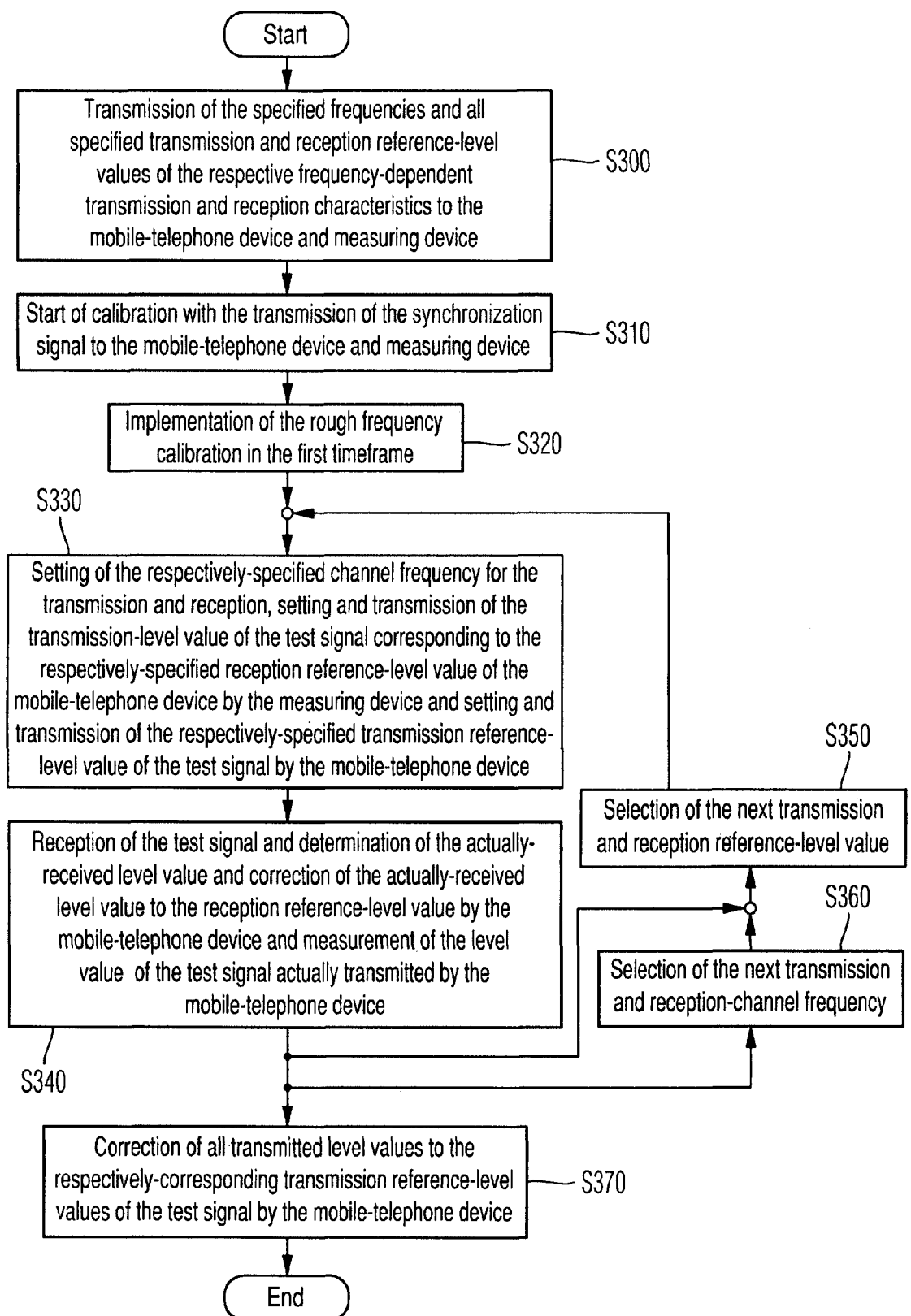
FIG. 9 shows a flow chart of the method according to the invention for simultaneous transmission and reception calibration of a mobile-telephone device.

FIG. 9 shows the flow chart of the method according to the invention for simultaneous transmission and reception calibration of a mobile-telephone device.

Procedural stage S300, for the transmission of the specified frequencies and the transmission and reception reference-level values of the associated operating-frequency-dependent transmission and reception characteristics of the mobile-telephone device $3_1$ associated with the respectively-specified frequencies; procedural stage S310 for starting the calibration procedure by means of the synchronization signal; and procedural stage S320 for calibration of the frequency oscillator correspond respectively to procedural stages S200, S210, and S220 of the method according to the invention for sequential transmission and reception calibration of a mobile-telephone device as shown in FIG. 8.

In procedural stage S330, the setting of the respectively-specified reception-channel frequency and of the transmission-level value of the test signal corresponding to the respectively-specified reception reference-level value of the mobile-telephone device $3_1$, and the transmission of the test signal set in this manner are implemented by the measuring device 5 in the same manner as in procedural stage S130 of the method according to the invention for reception calibration of a mobile-telephone device according to FIG. 6; and in parallel, the adjustment of the respectively-specified transmission-channel frequency and of the respectively-specified transmission reference-level value and the transmission of the test signal adjusted in this manner are implemented by the mobile-telephone device $3_1$ by analogy with procedural stage S30 of the method according to the invention for transmission calibration of a mobile-telephone device according to FIG. 2.

In procedural stage S340, the reception of the test signal, the determination of the actually-received level value and the correction of the actually-received level value to the respective reception reference-level value by the mobile-telephone device are implemented by analogy with procedural stage S140 of the method according to the invention for reception calibration of a mobile-telephone device according to FIG. 6; and in parallel, the measurement of the level value actually transmitted from the mobile-telephone device 31 is implemented by the measuring device 5 by analogy with procedural stage S40 of the method according to the invention for transmission calibration of a mobile-telephone device according to FIG. 2.

After respectively one transmission-level value and reception-level value of the transmission or respectively reception characteristic of the mobile-telephone device $3_1$ has been successfully measured, if another transmission-level value of the transmission characteristic associated with the selected transmission-channel frequency and another reception-level value of the reception characteristic of the mobile-telephone device $3_1$ associated with the reception-channel frequency is to be measured and/or calibrated, the transmission and reception reference-level value required for the next measurement and/or calibration procedure is selected in procedural stage S350, and the measurement or calibration is continued with procedural stage S330.

If all the transmission-level values of an operating-frequency-dependent transmission characteristic have been measured and respectively all reception-level values of an operating-frequency-dependent reception characteristic have been calibrated, and at the same time, all operating-frequency-dependent transmission characteristics and all operating-frequency-dependent reception characteristics of the mobile-telephone device $3_1$ have not yet been adjusted, the frequency of the next transmission and reception channel is selected in procedural stage S360, and the next transmission and reception reference-level values, which correspond to the respectively first transmission and reception reference-level values of the transmission and reception characteristic to be calibrated subsequently, are selected in procedural stage S350.

Procedural stages S330, S340, S350, and S360 are then repeated iteratively until all actually-received level values have been corrected to the associated reception reference-level values of the operating-frequency-dependent reception characteristics of all transmission channels to be calibrated, and all transmitted level values of the associated transmission characteristic have been measured.

Finally, in the concluding procedural stage S370, all of the level values actually transmitted from the mobile-telephone device $3_1$ are supplied by the measuring device 5, via the connecting line 4, the superordinate unit for procedural control 1 and the connecting line 2, to the mobile-telephone device $3_1$, in which the actually-transmitted level values are corrected to the respectively-corresponding transmission reference-level values.

Instead of a strictly-simultaneous calibration of the transmission and reception characteristic, in which, according to FIG. 9 respectively one transmission value is adjusted at one transmission-channel frequency, and simultaneously one reception value is adjusted at one reception-channel frequency, it is possible according to the invention to adjust all transmission-level values of a transmission characteristic in sequence at one transmission channel frequency, and then to adjust all reception-level values of one reception characteristic in sequence at one reception-channel frequency or vice versa, before the transmission and reception-level values of the transmission and reception characteristic of the next transmission channel are measured or respectively calibrated in the same order.

Figure 10:
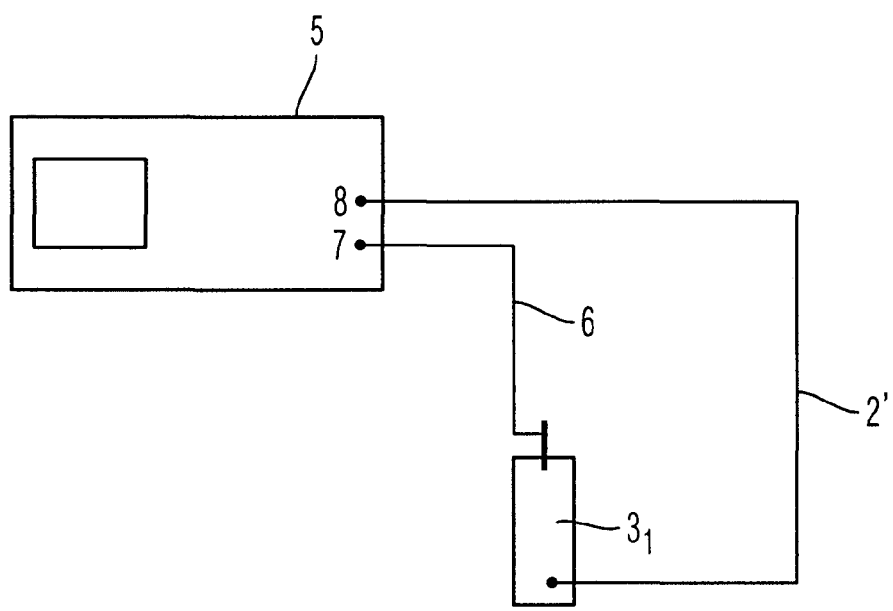
FIG. 10 shows a block circuit diagram of a second embodiment of a system according to the invention for transmission and reception calibration of a mobile-telephone device.

FIG. 10 shows a second embodiment of the system according to the invention for transmission and reception calibration of a mobile-telephone device. By contrast with the first embodiment, a unit for superordinate procedural control 1 in the second embodiment is not required and the measuring device 5 is connected directly via the connecting line 2' to the mobile-telephone device. The operating frequencies specified by the respective mobile-telephone standard or by the user, and the transmission and reception reference-level values associated with the operating-frequency-dependent transmission or respectively reception characteristic are stored in advance either in the measuring device 5 or in the mobile-telephone device $3_1$ and are transmitted, respectively in procedural stages S10 in FIG. 2, S100 in FIG. 6, S200 in FIG. 8, and S300 in FIG. 9 of the method according to the invention for transmission and/or reception calibration of a mobile-telephone device, to the other device in each case - to the mobile-telephone device $3_1$ or respectively to the measuring device 5. Moreover, the self-synchronization, respectively in procedural stages S20 in FIG. 2, S110 in FIG. 6, S210 in FIG. 8, and S310 in FIG. 9 of the method according to the invention for transmission and/or reception calibration of a mobile-telephone device, is implemented in each case between the measuring device 5 and the mobile-telephone device 31 without the participation of a further device.

Figure 11:
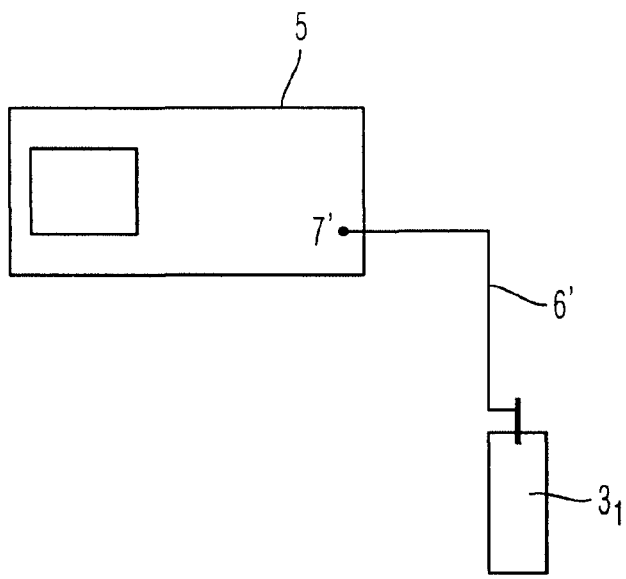
FIG. 11 shows a block circuit diagram of a third embodiment of a system according to the invention for transmission and reception calibration of mobile-telephone device.

In the third embodiment of the system according to the invention for transmission and reception calibration of a mobile-telephone device, as illustrated in FIG. 11, by way of difference from the first and second embodiment, the transmission between the measuring device 5 and the mobile-telephone device $3_1$ is implemented in both directions— transmission and reception mode of the mobile-telephone device $3_1$—via a single port 7' and a single connection 6'.

Figure 12:
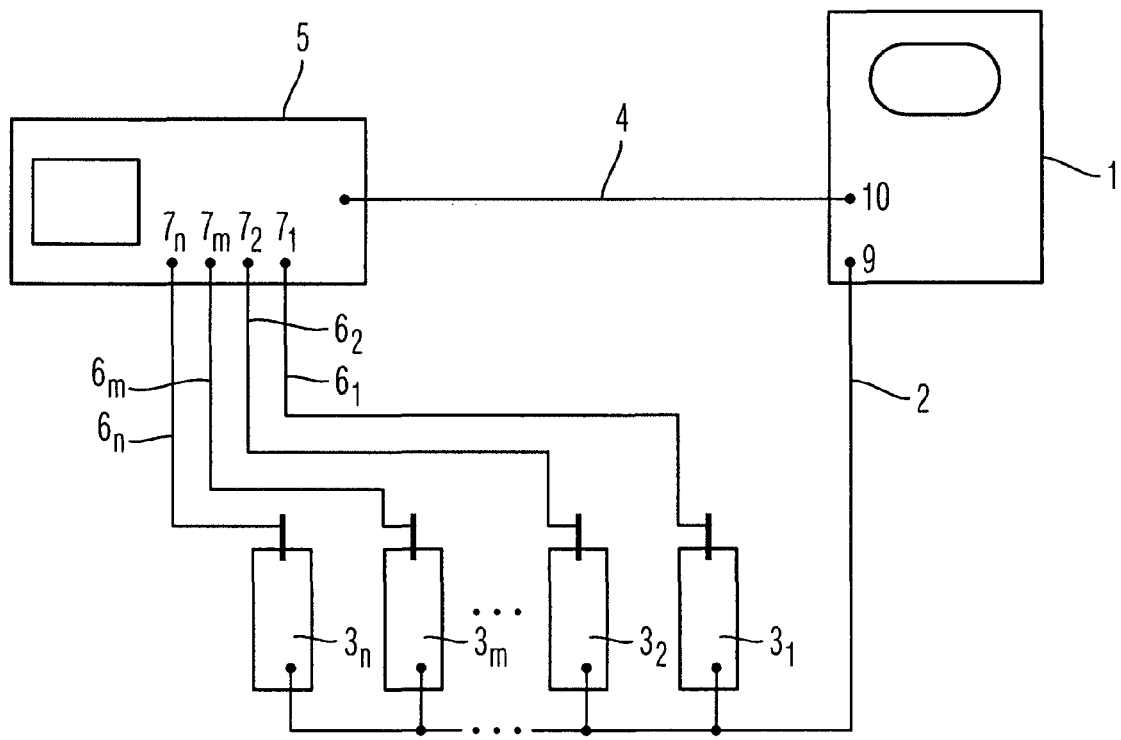
FIG. 12 shows a block circuit diagram of a first embodiment of a system according to the invention for parallel transmission and reception calibration of several mobile-telephone devices.

FIG. 12 shows the block circuit diagram of a system according to the invention for parallel transmission and reception calibration of several mobile-telephone devices $3_1$, $3_2, \ldots, 3_m, 3_n$.

Since the measuring device 5 provides a total of n measuring units and n ports $7_1, 7_2, \ldots, 7_m, 7_n$, which are connected respectively with one of the total of n mobile-telephone devices $3_1, 3_2, \ldots, 3_m$ and $3_n$ respectively via one connecting line $3_1, 3_2, \ldots, 3_m$ and $3_n$, a parallel transmission and reception calibration of each of the total of n mobile-telephone devices $3_1, 3_2, \ldots, 3_m$ and $3_n$ is possible.

In the sense of procedural stages S10, S100, S200, and S300 of the method according to the invention for transmission and/or reception calibration according to FIGS. 2, 6, 8, and 9, the individual transmission-channel and reception-channel frequencies and the transmission and reception reference-level values of the transmission and reception characteristic associated with the respective transmission-channel and reception-channel frequency are transmitted from the superordinate unit for procedural control 1 respectively via the connecting line 4 and 2.

After the start of the calibration procedures by means of a synchronization signal according to procedural stages S20, S110, S210, and S310 of the method according to the invention for transmission and/or reception calibration according to FIGS. 2, 6, 8, and 9, and the optional implementation of the frequency calibration according to procedural stages S120, S220, and S320 of the method according to the invention for transmission and/or reception calibration in FIGS. 6, 8 and 9, the individual operating-frequency-dependent transmission and/or reception characteristics of the individual mobile-telephone devices $3_1, 3_2, \ldots, 3_m$ and $3_n$ can be calibrated in parallel in the sense of the method illustrated in FIGS. 2, 6, 8, and 9 for transmission and/or reception calibration.

Figure 13:
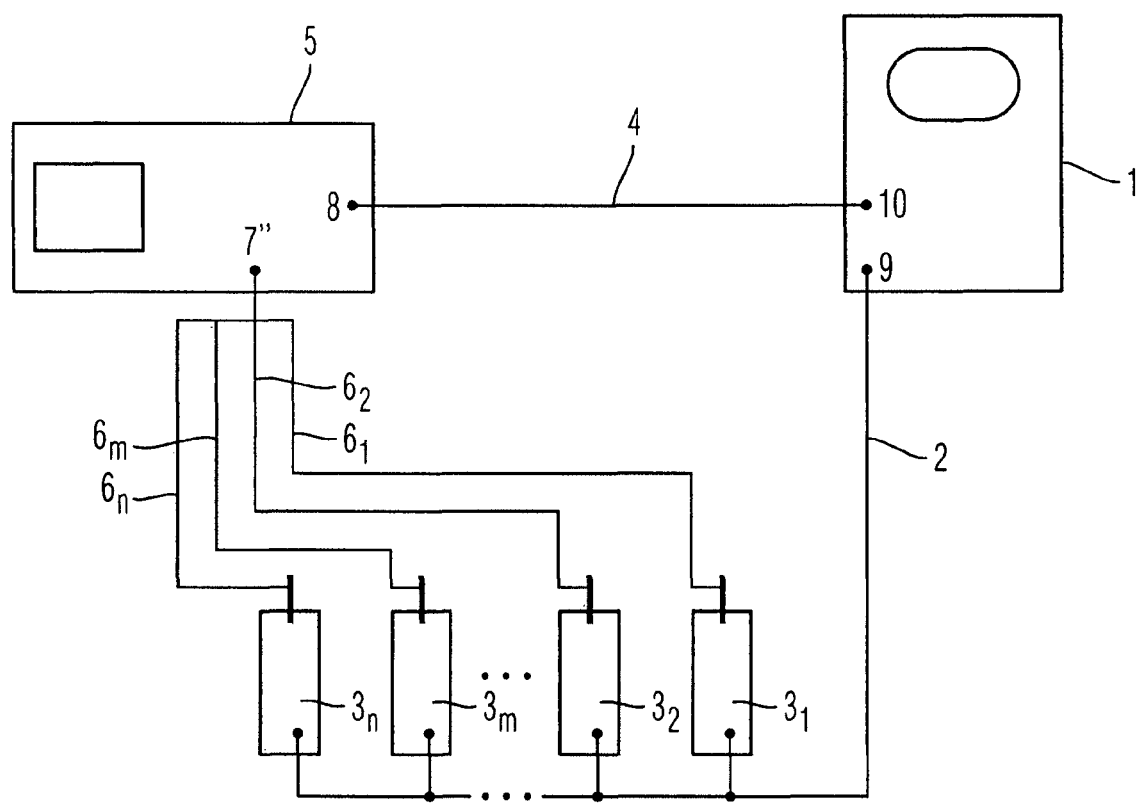
FIG. 13 shows a block circuit diagram of the second embodiment of the system according to the invention for parallel reception calibration of several mobile-telephone devices.

Finally, FIG. 13 shows the block circuit diagram of an embodiment of the system according to the invention for parallel reception calibration of several mobile-telephone devices, which, by way of difference from the first embodiment provides only a single port 7", to which all connecting lines $6_1, 2_2, \ldots, 6_m$ and $6_n$ are connected. By comparison with the embodiment of the system according to the invention for parallel transmission and reception calibration of several mobile-telephone devices shown in FIG. 12 with a total of n measuring units, the measuring device 5 of the embodiment of the system according to the invention for parallel reception calibration of several mobile-telephone devices illustrated in FIG. 13 provides only a single measuring unit.

According to procedural stage S130 of the method according to the invention for reception calibration of a mobile-telephone device in FIG. 6, the measuring device 5 generates a test signal with a transmission-level value, which corresponds to the respectively-specified reception reference-level value of the respectively-specified operating-frequency-dependent reception characteristic, which is identical for all mobile-telephone devices $3_1, 3_2, \ldots, 3_m, 3_n$, and transmits it via the ports $7_1, 7_2, \ldots, 7_m, 7_n, 7_n$ and the connecting lines $6_1$, $2_2, \ldots, 6_m$ and $6_n$ to the mobile-telephone devices $3_1$, $3_2, \ldots, 3_m, 3_n$ to be calibrated in parallel.

The test signal transmitted from the measuring device 5 is received by the mobile-telephone devices $3_1, 3_2, \ldots, 3_m, 3_n$. The mobile-telephone devices $3_1, 3_2, \ldots, 3_m, 3_n$ determine in parallel the actually-received level value at the output of the respective input amplifier and correct this to the specified reception reference-level value of an ideal reception characteristic of the input amplifier within the framework of the calibration procedure in procedural stage S140 of the method according to the invention for reception calibration of a mobile-telephone device. In this manner, it is possible to calibrate several mobile-telephone devices $3_1, 3_2, \ldots, 3_m, 3_n$ with regard to their reception characteristic using a test signal generated by a measuring device 5, of which the transmission-level value corresponds to the respectively-specified reception reference-level value.

In conclusion, the three embodiments of the system according to the invention for transmission and reception calibration of a mobile-telephone device in FIGS. 1, 10, and 11 can be combined with the embodiment of the system according to the invention for transmission and reception calibration of several mobile-telephone devices in FIG. 12 and the embodiment of the system according to the invention for reception calibration of several mobile-telephone devices in FIG. 13 in order to generate further embodiments of the system according to the invention for transmission and reception calibration of several mobile-telephone devices.

The invention is not restricted to the embodiment presented. In particular, the invention is not restricted to a given mobile telephone standard. Calibration processes for other parameters of a mobile-telephone device are also covered by the invention.

The invention claimed is:

1. Method for transmission and reception calibration of at least one mobile-telephone device by specifying for the mobile-telephone device(s) a given number of transmission reference-level values of a test signal respectively for a given number of transmission-channel frequencies of the test signal and a given number of reception reference-level values of the test signal for a given number of reception-channel frequencies of the test signal and by measuring the level values actually transmitted in the mobile-telephone device and the level values actually received in the mobile telephone device and actualizing them to the respectively-associated transmission reference-level values of the test signal and to the respectively-associated reception reference-level values of the test signal, wherein all measurements of the actually-transmitted level values and of the actually-received level values follow one another in direct succession as a result of the complete specification of all transmission-channel frequencies and of the transmission reference-level values associated with each transmission-channel frequency and of all reception-channel frequencies and of the reception reference-level values associated with each reception-channel frequency for the mobile-telephone device(s) before the start of any measurements, wherein the adjustment of the respectively-specified transmission-channel frequency and of the transmission-level value of the test signal corresponding to the respectively-specified reception reference-level value and the adjustment of the respectively-specified transmission-channel frequency and of the level value of the test signal actually transmitted in the mobile telephone device corresponding to the respectively-specified transmission reference-level value are performed simultaneously.

2. Method for transmission and/or reception calibration according to claim 1, comprising taking the transmission reference-level values specified for each specified frequency from the ideal transmission characteristic of the mobile-telephone device(s), and taking the reception reference-level values specified for each specified frequency from the ideal reception characteristic of the mobile-telephone device(s).

3. Method for transmission and/or reception calibration according to claim 1, comprising correcting each actually-received level value to the respectively-corresponding reception reference-level value directly after measuring each actually-received level value.

4. Method for transmission and/or reception calibration according to claim 1, comprising correcting each actually-received level value to the respectively-corresponding reception reference-level value after measuring all actually-received level values.

5. Method for transmission and/or reception calibration according to claim 1, comprising correcting each actually-transmitted level value to the respectively-corresponding transmission reference-level value after measuring all actually-transmitted level values.

6. Method for transmission and/or reception calibration according to claim 3, comprising correcting all actually-transmitted level values to the respectively-associated transmission reference-level values is implemented following the calibration of all actually-received level values to the respectively-associated reception reference-level value or vice versa.

7. Method for transmission and/or reception calibration according to claim 3, comprising correcting the actually-received level values for each specified reception-channel frequency to the respectively-associated reception reference-level values in parallel for several mobile-telephone devices.

8. Method for transmission and/or reception calibration according to claim 3, comprising implementing a frequency calibration of the frequency oscillator of the mobile-telephone device(s) before and/or during correction of the level values actually received for each specified reception-channel frequency to the respectively-associated reception reference-level values.

9. Method for transmission and/or reception calibration according to claim 1, comprising providing one timeslot with a given time duration for each measurement of a level value generated by the mobile-telephone device(s).

10. Method for transmission and/or reception calibration according to claim 9, wherein the timeslots for measurements of the level values associated with a specified transmission-channel frequency or reception-channel frequency are directly adjacent to one another within a timeframe.

11. Method for transmission and/or reception calibration according to claim 9, comprising arranging the timeslots for measurements of the level values associated with a specified transmission-channel frequency or reception-channel frequency respectively within a timeframe separated from one another in time by a given number of timeslots in which no measurement is implemented.

12. Method for transmission and/or reception calibration according to claim 9, comprising inserting a timeslot, in which no measurement is implemented, respectively in the transition between two transmission-channel frequencies or reception-channel frequencies associated respectively with one transmission channel.

13. Method for transmission and/or reception calibration according to claim 1, comprising starting the first measurement of a level value to be implemented with a synchronization of the mobile-telephone device(s) with a measuring device and/or a unit for super ordinate procedural control.

14. System for transmission and reception calibration of at least one mobile-telephone device with a measuring device and at least one mobile-telephone device, which receive(s) respectively for a given number of specified transmission-channel frequencies at least one specified transmission reference-level value of a test signal, which is used for the actualization of a level value actually transmitted in the mobile-telephone device(s) and measured by the measuring device, and for a given number of specified reception-channel frequencies at least one specified reception reference-level value of the test signal, which is used for the actualization of a level value actually received in the mobile-telephone device(s), wherein all measurements of the actually-received level values and actually-transmitted level values follow one another in direct succession as a result of the reception of all reception-channel frequencies and all reception reference-level values associated with each reception-channel frequency and all transmission-channel frequencies and all transmission reference-level values associated with each transmission-channel frequency by a unit for super ordinate procedural control or the measuring device before the start of any measurements, wherein the adjustment of the respectively-specified reception-channel frequency and of the transmission-level value of the test signal corresponding to the respectively-specified reception reference-level value and the adjustment of the respectively-specified transmission-channel frequency and of the level value of the test signal actually transmitted in the mobile telephone device corresponding to the respectively-specified transmission reference-level value are performed simultaneously.

15. System for transmission and/or reception calibration according to claim 14, wherein the reference-level values are transmission reference-level values and/or reception reference-level values, and the level values actually generated by the mobile-telephone device(s) are actually-transmitted level values and/or actually-received level values.

16. System for transmission and/or reception calibration according to claim 14, wherein the specification of the frequencies and the reference-level values is implemented by the mobile-telephone device(s).

17. System for transmission and/or reception calibration according to claim 14, wherein the transmission of the reference-level values and the level values actually generated by at least one mobile-telephone device is implemented over at least one line connection.

* * * * *